United States Patent [19]
De Baun

[11] 3,733,900
[45] May 22, 1973

[54] FAN CAPACITY MEASURING STATION
[75] Inventor: Kenneth W. De Baun, Novato, Calif.
[73] Assignee: Air Monitor Corporation, Santa Rosa, Calif.
[22] Filed: Nov. 22, 1971
[21] Appl. No.: 201,127

[52] U.S. Cl. ............... 73/212, 73/205 L, 73/168
[51] Int. Cl. .................................... G01f 1/00
[58] Field of Search ........... 73/168, 205, 205 L, 73/212

[56] References Cited
FOREIGN PATENTS OR APPLICATIONS
724,276  2/1955  Great Britain ................ 73/212

*Primary Examiner*—Richard C. Quiesser
*Assistant Examiner*—Arthur E. Korkosz
*Attorney*—Eckhoff, Hoppe, Slick, Mitchell and Anderson

[57] ABSTRACT

A fan capacity measuring station wherein the fan discharge is first conditioned for accurate flow rate measurement by fixed mixing vanes that break up stratification and negative pressure pockets and by subsequent straightening means that eliminate turbulence and produce substantially laminar air flow through a measuring section of known cross-sectional area. Then in the measuring section total pressure sensors, manifolded in a traverse, average the total pressure and manifolded static pressure sensors average the static pressure. The difference between the average total and static pressure of the conditioned discharge is a direct and accurate measurement of flow rate within ±1 percent.

5 Claims, 7 Drawing Figures

PATENTED MAY 22 1973 3,733,900
SHEET 1 OF 2
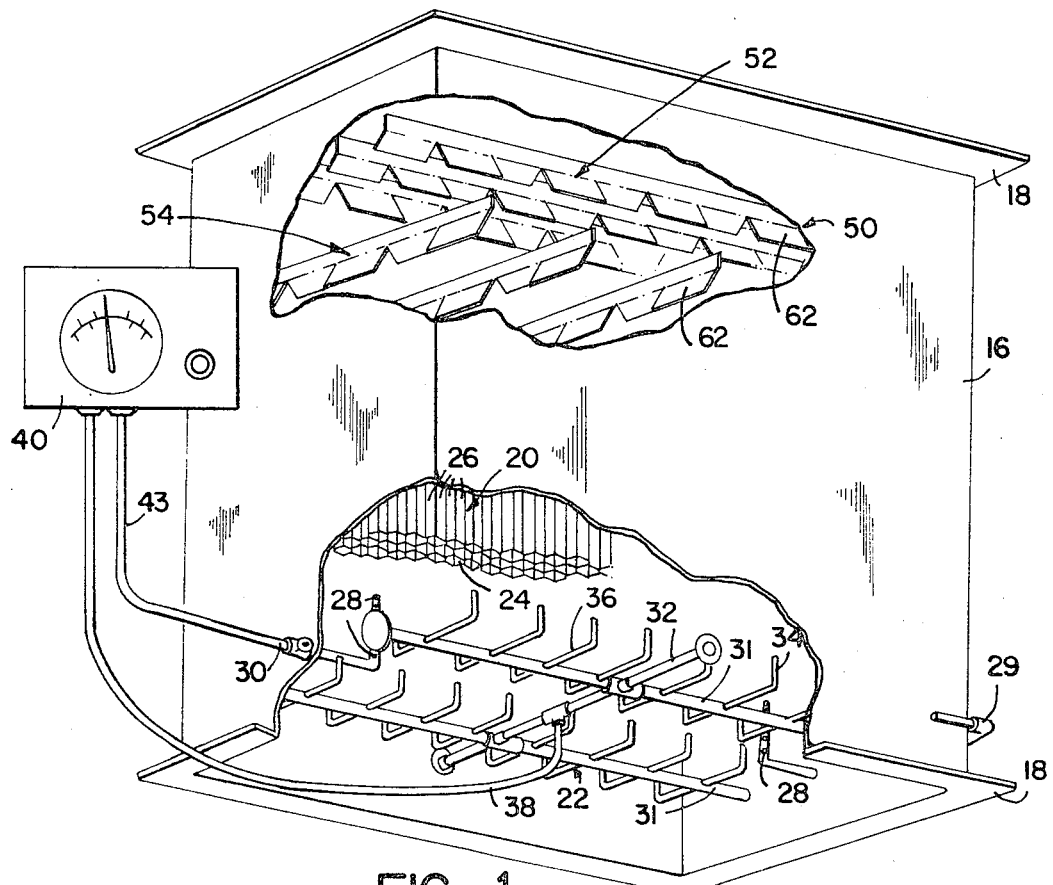
FIG_3
FIG_1
FIG_2
INVENTOR.
KENNETH W. DeBAUN
BY
ATTORNEYS

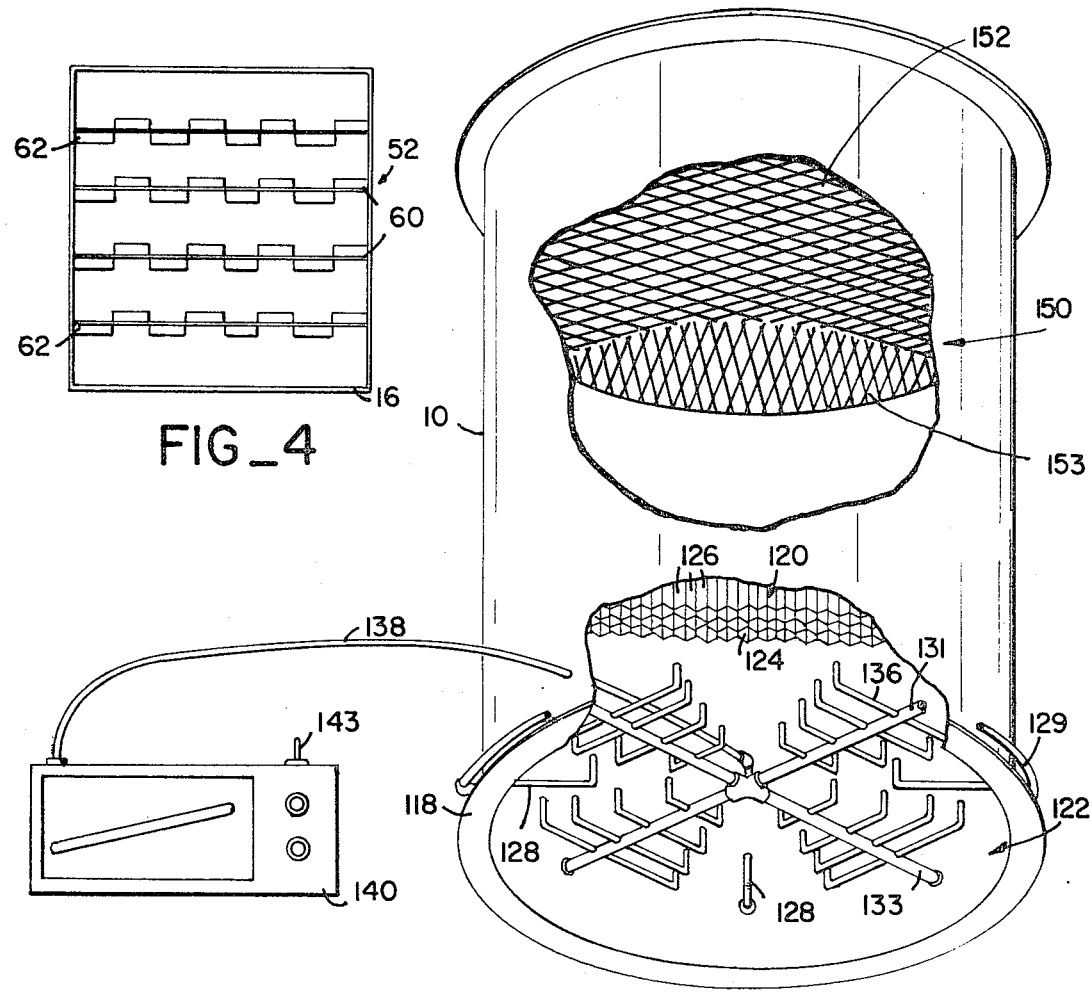
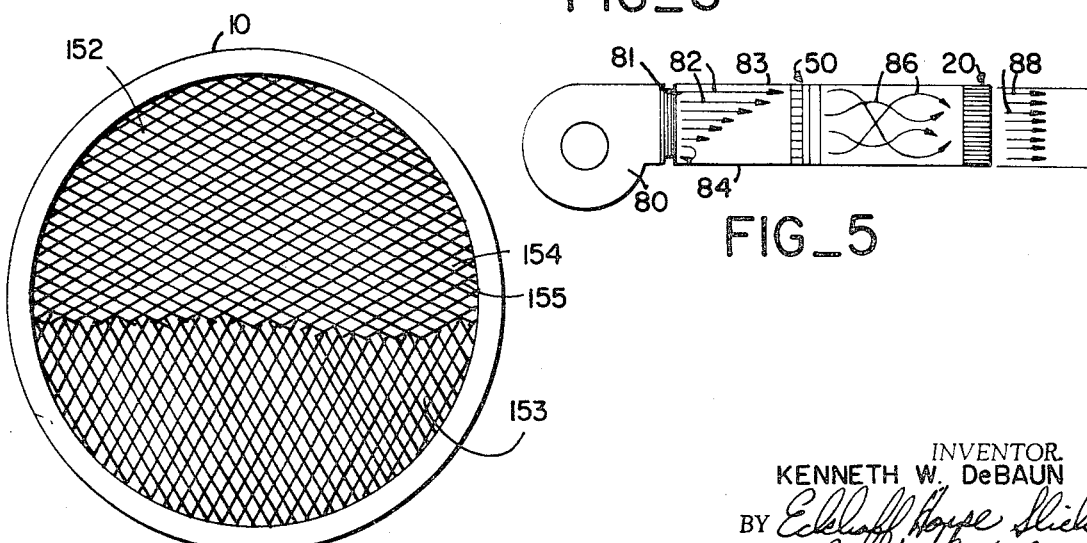

FAN CAPACITY MEASURING STATION

This invention relates generally to air flow rate measuring devices and methods for fans, blowers and other air moving equipment and more particularly relates to an integrated station for accurately measuring field installed fan operating capacities.

The system described herein embodies some of the features disclosed in co-pending application Ser. No. 27,758 filed Apr. 13, 1970 for an Air Monitoring System, now U.S. Pat. No. 3,685,355. For convenience the air moving device is described herein as a centrifugal fan but the system is equally applicable to blowers, other types of air moving devices and to flow rate measurement generally in duct systems closely proximate flow disturbances such as sharp turns, elbows and the like.

The measurement of installed and operating fan capacity is of critical importance in ventilation, air conditioning, and forced-air heating systems. Prior art flow rate or capacity measurement either requires substantial lengths of straight duct before and after the measuring devices, is indirect as by amperage and fan brake horsepower, or develops false measurements caused principally by stratified air flow or by non-uniform static pressure or flow conditions.

A primary object of this invention is to provide a method and apparatus for measuring air flow rate capacity of fans in which straight sections of duct on either side of a measuring station are unnecessary and in which stratified air flow and non-uniform static pressure inaccuracies are substantially eliminated.

Another object of this invention is to provide an air-flow measuring method and apparatus which may be used in close proximity to flow disturbances or even at a centrifugal fan discharge without being affected by their normally stratified flow conditions.

Another object of this invention is to provide a method and apparatus for measuring air flow rate or velocity with very accurate and reliable output without moving parts or electrical power and which do not substantially restrict air flow.

A further object of this invention is to provide apparatus responsive to air flow which can actuate volume adjusting devices or dampers to control to a selected flow rate regardless of static pressure changes in a duct system.

Further objects and advantages of this invention will become apparent from consideration of the following description of preferred embodiments and the accompanying drawings wherein FIG. 1 is a perspective view, partly in section, of one embodiment of the integrated air flow measuring station of this invention;

FIG. 2 is a schematic vertical cross-sectional view of the air flow measuring station of FIG. 1;

FIG. 3 is a side view of one static mixing vane of the station shown in FIGS. 1 and 2;

FIG. 4 is a top view of the station of FIG. 1 taken along line 4—4 of FIG. 2;

FIG. 5 is a schematic representation of the steps involved in the air flow measuring method of this invention;

FIG. 6 is a perspective view, partly in section, of another embodiment of an integrated station useful in circular configurations;

FIG. 7 is a top view of the air mixing vanes used in the station of FIG. 6.

FIG. 1 illustrates an application of this invention to a rectangular fan discharge or air duct. The integrated station comprises a rectangular casing 16, of predetermined cross-sectional area which has flanges 18 at its ends for connection directly to the fan or to adjacent sections of the air duct (not shown). The measuring station comprises three integrated sections: an air mixing section 50, an air flow straightening section 20, and a metering section 22.

The air mixing section substantially eliminates stratification of air flow, reduces negative static pressure pockets, and equalizes the flow of air over the cross-sectional area of the station by turbulently blending or mixing the flowing air. Stratification of air flow is common at a centrifugal fan discharge where air tends to "pile up" at one side. It also can occur along one wall of a duct or be caused by elbows or turns in a duct system. Air straightening section 20 then substantially eliminates turbulence in the air flowing through the station and converts it substantially to a laminar flow condition through the metering section 22.

Air straightening section 20 comprises flow straightening means 24 made from expanded honeycomb made of aluminum or other rigid material. The honeycomb forms a plurality of relatively small, axially extending passages 26 that fill the entire cross-section of the casing 16. The depth, or axial extent, of the straightening means 24 is significant and is at least greater than the diameter of the passages 26 therein. The wall thickness of the honeycomb, however, is extremely small so that there is a negligible loss of air pressure when air flows through the honeycomb passages.

The metering section 22 includes a plurality of static pressure sensing tips 28 manifolded together with tubing 29 to provide the average static pressure at the metering section cross-section as at 30. The static sensing tips 28 are closed-end tubes perforated with a plurality of holes around the peripheries of their ends, which ends are directed towards the air stream. Air essentially flows past these holes without impacting upon them.

The metering section 22 also includes a total pressure sensing network. This network in the embodiment of FIG. 1 consists of two manifold headers 31 oriented parallel to one another and interconnected at their centers by cross-tube 32. Cross-tube 32 and headers 31 are closed at their ends. Each header 31 connects a plurality of total pressure sensors 34 that are so arranged as to have their open sensing tips positioned immediately adjacent to and downstream of the honeycomb of passages 26 in the air straightening means 24. The open tip of each sensor 34 faces the direction of air flow through the casing and receives its full impact. The tips are oriented and distributed to make an accurate traverse of the metering section cross-sectional area as is more particularly described in co-pending application Ser. No. 27,758.

Small, tubular conduits 36 communicate sensed total pressure to the manifold headers 31. Conduit 38 communicating with the center of cross-tube 32 connects a remotely located dry manometer 40. The average static pressure at 30 also supplies manometer 40 through conduit 43. The total pressure supplied by conduit 38 is the average total pressure at the traverse. Manometer 40 displays the difference between average total pressure and static pressure directly as the quantity of air flowing through the station.

FIG. 2 shows that the air mixing section 50 includes grids 52 and 54 of fixedly mounted air deflecting vanes. Components of the grids 52 are shown in FIGS. 3 and 4. Each includes several deflection vanes 60 comprising a stem 61 and carrying a plurality of canted fins 62. Stem 61 is sheet metal or similar thin material with its edge 63 facing directly upstream into and in line with the air flow as shown by arrows 65. Fins 62 connect to stem 61 and are canted at an angle to the direction of air flow. For example, fin 67 is at a 120° angle to fin 68 and to the stem. The deflection vanes 60 of grid 52 are oriented at 90° relative to those of grid 54. The air flow past these vanes deflects or mixes by the turbulence which they create as shown schematically in FIG. 5.

The phenomenon of stratified air flow is shown in FIG. 5 where centrifugal fan 80 discharges air into duct 81 in the general direction shown by arrows 82. The longest arrow indicates that the air piles up along wall 83. The term "stratification" is used to refer to the resultant differential air flow rates across the air duct generally shown by the length of arrows 82. In close proximity to a fan, it is not unusual to have a very large flow rate along one wall such as along wall 83. The air mixing section 50, which comprises the grids 52 and 54 of deflection vanes 60, oriented at 90° with respect to each other substantially reduces the stratification of air flow by deflecting air which flows along wall 83 towards the center of the station. Air flowing along wall 84 is similarly deflected toward the center of the station. As shown by arrows 86, all air flowing in the station is thoroughly and turbulently mixed.

The mixed air then passes through air straightening means 24 in section 20 which straightens the air flow into laminar flow as shown by arrows 88. The net effect of the mixing and straightening sections is substantially to eliminate stratified air flow and negative static pressure pockets caused by fan 80 and to spread the flow uniformly through the duct under laminar flow conditions.

Elimination of the stratification of air flow achieves several important advantages. Perhaps the greatest is that the total pressure sensors 34 of metering section 22 (not shown in FIG. 5) are not subjected to reduced pressure values which, but for the mixing section 50, would persist along wall 84. This enables each sensor to respond with a minimum differential pressure occurring across the cross-sectional area of the fan discharge of air duct at the metering section 22. Accuracy of the total pressure traverse increases significantly to something in the order of ±1 percent.

FIG. 6 shows an alternate embodiment of this invention having circular casing 10 and employing expanded metal mixing vanes. The components of this embodiment are analogous to those of the embodiment shown in FIG. 1. Components which perform similar functions to those in FIG. 1 have the same reference numerals preceded by a 1. Thus, static pressure sensing tips 28 of FIG. 1 perform the same function as sensing tips 128 of FIG. 6. The average static pressure at the metering station 122 which they develop supplies wet manometer 140 via tubing 129 and conduit 143. Similarly, conduit 138 communicates to the manometer the average total pressure developed by sensors 134 connected by tubular conduits 136 to the traverse headers 131,133.

The mixing section 150 of the unit in FIG. 6 comprises a pair of expanded metal grids 152, 153 placed transversely across the casing 10 and spaced about two inches apart and fifteen inches upstream of straightening section 120 for a 30 inch diameter casing. Expanded metal grids usually have diamond-shaped openings 154 between ribs 155 that are canted by stretching in the manufacturing processes with respect to the plane of the grid. Here the diamond-shaped openings in the two grids 152, 153 are oriented at 90 degrees with respect to one another. The ribs 155 are canted with respect to the casing axis and direction of air flow to provide the requisite mixing action.

The straightening station 120 of FIG. 6 includes rigid honeycomb straightening means 124 with passages 126.

Thus, the invention provides for the conditioning of air flowing from a fan or blower discharge or in an air duct through a mixing step and a straightening step prior to passing the air under laminar flow conditions to pressure sensors distributed in a traverse at a known cross-sectional area. The air flow rate past the sensing tips is directly related to the difference between the average total pressure and average static pressure sensed at the known cross-sectional area. The apparatus and method of this invention provide continuous and instantaneous monitoring or measurement of air flow rate which is extremely accurate and can be used directly in a meter as shown or used to operate fan control devices, etc. which are not shown.

The specific embodiments described above are for illustrative purposes only. It will be apparent to those skilled in this art that modifications to them may be made and equivalents substituted which are within the scope of the invention defined in the following claims.

I claim:

1. A method for measuring air flow at a flow measuring station comprising the steps of
   first turbulently mixing air flowing to the station to eliminate substantially all stratification;
   then eliminating turbulence in the mixed air to produce substantially laminar flow through a known cross-sectional area;
   sensing the average total pressure of air flowing at said cross-sectional area;
   sensing the average static pressure at said cross-sectional area; and then employing the difference in the average total pressure and average static pressure as a direct measurement of air flow at said cross-sectional area.

2. An air flow measuring station comprising a casing; a mixing section turbulently mixing air flowing in said casing to eliminate substantially all stratification;
   straightening means eliminating turbulence in the mixed air to produce substantially laminar flow through a known cross-sectional area of said casing;
   first sensor means sensing the average total pressure of air flowing at said cross-sectional area;
   second sensor means sensing the average static pressure at said cross-sectional area;
   and meter means employing the difference in the average total pressure and average static pressure as a direct measurement of air flow at said cross-sectional area.

3. The air flow measuring station of claim 2 wherein said mixing section comprises fixed deflection vanes having a plurality of fins mounted at an angle to the axis of said air flow.

4. The air flow measuring station of claim 2 wherein said mixing station comprises at least one expanded metal grid.

5. The air flow measuring station of claim 2 wherein said straightening means comprises a honeycomb of tubular passages aligned with the direction of air flow downstream of said mixing means.

* * * * *